Patented Sept. 10, 1935

2,013,767

UNITED STATES PATENT OFFICE 2,013,767

TREATING RARE-EARTH METAL COMPOUNDS

Rudolf Schulze, Bitterfeld, Germany, assignor to I. G. Farbenindustrie Aktiengesellschaft, Frankfort-on-the-Main, Germany No Drawing. Application March 10, 1933, Serial No. 660,305. In Germany March 12, 1932

8 Claims. (Cl. 23—22)

The present invention relates to improvements in working ores containing rare-earth metals, and particularly to improvements in the separation of thorium from the metals belonging to the cerium group.

In the preparation of the pure compounds of the cerium metals which at present generally is started from monazite ores, the separation of the thorium from the metals belonging to the cerium group offers certain difficulties. It has been suggested to decompose the ores by a smelting process, then to dissolve the smelt in concentrated hydrochloric acid, evaporate to dryness and finally to leach the calcined product with water, this resulting in the rare-earth metals of the cerium group being dissolved, whilst thorium remains in the residue.

It is an object of the present invention to replace the cumbersome and by no means efficient steps of concentrating the hydrochloric acid solution of the rare earth metals to dryness and of the subsequent leaching with water by a simpler and more reliable method. The latter is based on the discovery that the solubility of the hydrated chlorides of thorium and the yttrium group on the one part, and of those of the cerium group on the other part is widely different in solutions containing free chlorine ions and that this difference in solubility allows of a separation of the cerium group from the mixture provided certain conditions of concentration and temperature are maintained.

According to one modification of the present invention an aqueous solution containing the rare earth metal compounds—as obtained for instance by decomposition of monazite in known manner—is treated with hydrochloric acid gas while cooling. Instead of, or along with, hydrochloric acid, it is however also possible to add to such aqueous starting solution, chlorides which are more easily soluble than cerium chloride, and which further are not precipitated by hydrochloric acid at room temperature (for instance, calcium or magnesium chloride). Both procedures cause the chloride hydrates of the cerium group to crystallize practically completely from the solution whilst thorium chloride remains dissolved.

When working with hydrochloric acid alone it is necessary to cool the solution down to about 0° C. in order to bring about a practically complete precipitation of the hydrated chlorides of the cerium group. When, however, calcium and/or magnesium chloride is added to the solution, if desired together with hydrochloric acid gas, crystallization of practically all the chlorides of the cerium group takes place already at about 20° C. When precipitated in this manner the chlorides of the cerium group are not contaminated by the added foreign chlorides since the latter are not precipitated, under the conditions of working, by hydrochloric acid from concentrated solutions at room temperature.

After washing the precipitated hydrated chlorides which contain about 95 to 98 per cent of the total of the metals of the cerium group contained in the solution, with concentrated hydrochloric acid, the hydrates are entirely free from thorium; the filtrate contains besides all the thorium chloride and all the chlorides of the yttrium group a small percentage of unprecipitated cerium chloride.

It may be regarded as a particular advantage of the precipitating method according to the invention that the crystals of the hydrated chlorides of the cerium group obtained in the process do not contain thorium chloride either in adsorption or as an inclusion, whereas such contamination invariably occurs when working by the known methods of separation because of the excessive mutual affinity of the rare earth metal compounds. Formerly, this circumstance regularly necessitated a repeated precipitation in order to achieve a complete separation. A further advantage of the present method resides in that it is not necessary in the process according to the invention to eliminate the phosphoric acid contained in the monazite prior to separation.

In order to recover the thorium from the mother liquors, that element is, after removal of the hydrochloric acid in excess, preferably precipitated as the oxalate together with the traces of cerium chloride still present, in known manner, the thorium then being separated therefrom by one of the usual methods. The cerium chloride still contained in the mother lyes obtained by the present method does not exceed about one half the quantity by weight of the thorium chloride present whilst the former processes of working up monazite involved the necessity of separating about 10 times the quantity of oxides of the cerium group from the thorium oxide. Also in this respect, therefore, the present process constitutes a marked progress over the art.

Examples (1) A solution containing 85 kgs. of chlorides of the cerium group and 8 kgs. of thorium chlorides in 140 kgs. of water is treated with hydrochloric acid gas while stirring and cooling to between 0° C. and −5° C., until saturation is established. In this manner, the hydrated chlorides of the cerium group are precipitated in the shape of fine crystals which are easily separated from the mother liquor by filtration and then washed with cooled concentrated hydrochloric acid. The washed crystals contain 97 percent of the cerium contained in the starting solution and are entirely free from thorium.

(2) To the same starting solution as employed in Example 1, 40 kgs. of calcium chloride are added and hydrochloric acid gas is introduced into the mixture while stirring and cooling so as to maintain a temperature of 20° C. until saturation is attained. In this case it is necessary to more thoroughly wash the precipitated chlorides of the cerium group with concentrated hydrochloric acid so as to completely remove all traces of calcium chloride. The yield in chlorides of the cerium group amounts to 95 percent, the product being free from thorium compounds.

(3) To a starting solution as employed in Examples 1 and 2, 80 kgs. of anhydrous calcium chloride or 70 kgs. of anhydrous magnesium chloride are added. On cooling the warm solution, the hydrated chlorides of the cerium group are precipitated, and after separating from the viscous mother liquor by centrifuging, are washed with concentrated hydrochloric acid. Yield: 90 percent.

I claim:—

1. A process of recovering compounds of metals belonging to the cerium group from aqueous solutions containing, besides such compounds also compounds of the thorium and yttrium groups of the rare-earth metals, which comprises establishing in such solution a concentration of chlorine ions sufficient to cause precipitation of the hydrated chlorides of the metals belonging to the cerium group while cooling the solution to at least about 0° C., and separating such precipitated hydrated chlorides from the remaining solution.

2. A process of recovering compounds of metals belonging to the cerium group from aqueous solutions containing, besides such compounds, also compounds of the thorium and yttrium groups of the rare-earth metals, which comprises adding to such solution chlorides of metals which are more easily soluble than the chlorides of the cerium group metals and which remain in solution at room temperature when hydrochloric acid is introduced into the said solution, introducing hydrochloric acid gas into the said solution so as to precipitate the hydrated chlorides of the metals belonging to the cerium group, and separating such precipitated hydrated chlorides from the remaining solution.

3. A process of recovering compounds of metals belonging to the cerium group from aqueous solutions containing, besides such compounds, also compounds of the thorium and yttrium groups of the rare-earth metals, which comprises adding to such solution at least one chloride of the group of metals consisting of magnesium and calcium, introducing hydrochloric acid gas into the said solution so as to precipitate the hydrated chlorides of the metals belonging to the cerium group, and separating such precipitated hydrated chlorides from the remaining solution.

4. A process of recovering compounds of metals belonging to the cerium group from aqueous solutions containing besides such compounds also compounds of the thorium and yttrium groups, all rare-earth metal compounds being present in the form of chlorides, which comprises adding to such solution chlorides of metals which are more easily soluble than the chlorides of the cerium group metals and which remain in solution at room temperature, in a quantity sufficient to cause precipitation of the hydrated chlorides of the metals belonging to the cerium group, and separating such precipitated hydrated chlorides from the remaining solution.

5. A process of recovering compounds of metals belonging to the cerium group from aqueous solutions containing besides such compounds also compounds of the thorium and cerium groups, all rare-earth metal compounds being present in the form of chlorides, which comprises adding to such solution at least one chloride of the group of metals consisting of magnesium and calcium in a quantity sufficient to cause precipitation of the hydrated chlorides of the metals belonging to the cerium group, and separating such precipitated hydrated chlorides from the remaining solution.

6. A process which comprises decomposing monazite in such a manner as to obtain a mixture which is soluble in hydrochloric acid, dissolving such mixture in hydrochloric acid, treating the solution with hydrochloric acid gas while cooling it to at least about 0° C. so as to precipitate the metals of the cerium group as hydrated chlorides, removing such precipitate from the mother liquor, causing the precipitation of oxalates of thorium, of the metals of the yttrium group, and of the remaining cerium group metals from such mother liquor, and working up such precipitate so as to recover thorium compounds therefrom.

7. A process which comprises decomposing monazite in such a manner as to obtain a mixture which is soluble in hydrochloric acid, dissolving such mixture in hydrochloric acid, adding to the solution chlorides of metals which are more easily soluble than the chlorides of the cerium group metals and which remain in solution at room temperature when hydrochloric acid is introduced into the solution, treating the solution with hydrochloric acid gas so as to precipitate the metals of the cerium group as hydrated chlorides, removing such precipitate from the mother liquor, causing the precipitation of oxalates of thorium, of the metals of the yttrium group, and of the remaining cerium group metals from such mother liquor, and working up such precipitate so as to recover thorium compounds therefrom.

8. A process which comprises decomposing monazite in such a manner as to obtain a mixture which is soluble in hydrochloric acid, dissolving such mixture in hydrochloric acid, adding to the solution obtained chlorides of metals which are more easily soluble than the chlorides of the cerium group metals and which remain in solution at room temperature when hydrochloric acid is introduced into the said solution in a quantity sufficient to precipitate the metals of the cerium group as hydrated chlorides, removing such precipitate from the mother liquor, causing the precipitation of oxalates of thorium, of the metals of the yttrium group, and of the remaining cerium group metals from such mother liquor, and working up such precipitate so as to recover thorium compounds therefrom.

RUDOLF SCHULZE.